Oct. 5, 1965
L. S. BAIER
3,209,663
HATCH COVER
Filed May 22, 1962
3 Sheets-Sheet 1
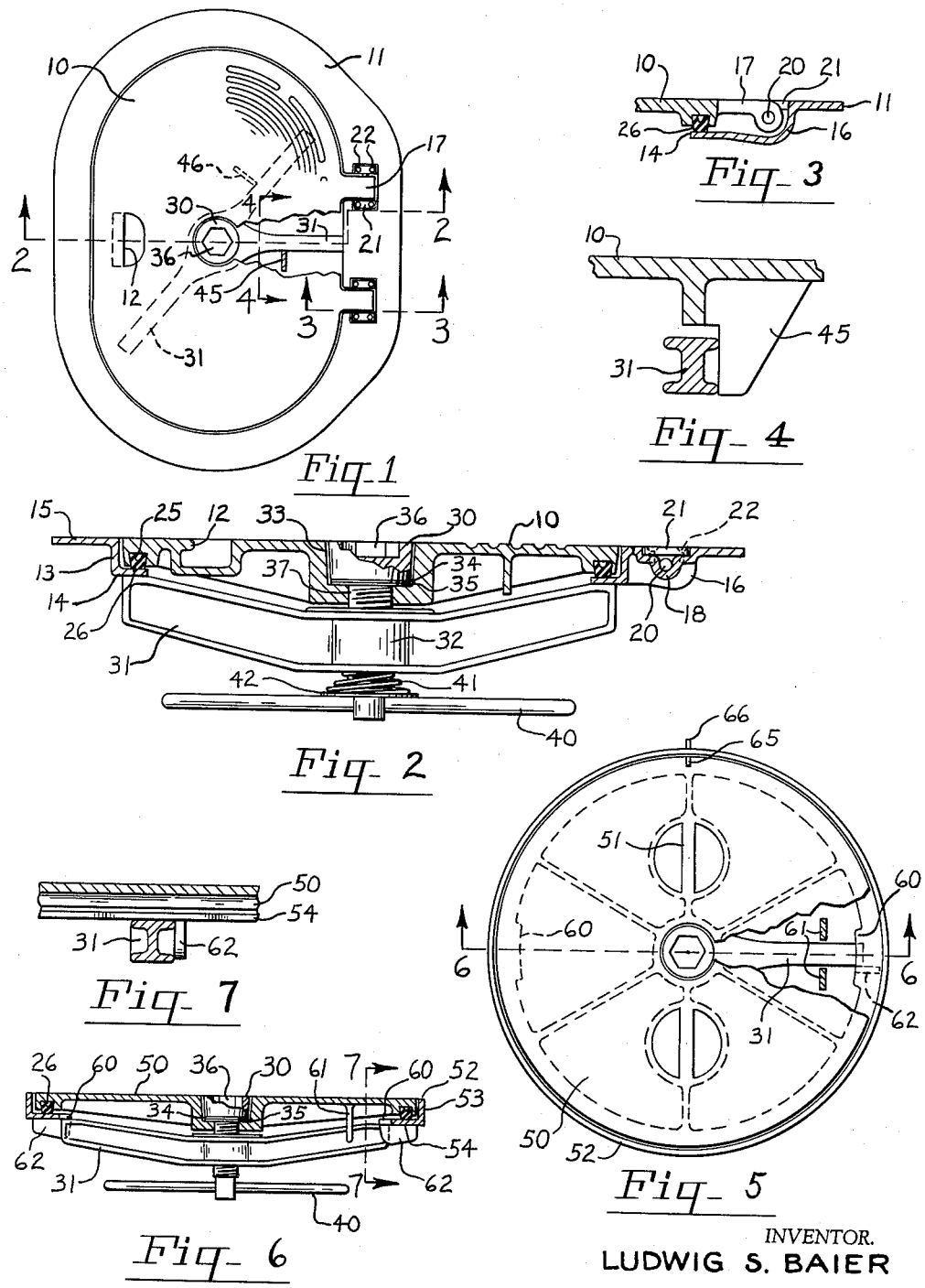
INVENTOR.
LUDWIG S. BAIER
BY
*Schermerhorn*
Attorney Oct. 5, 1965   L. S. BAIER   3,209,663
HATCH COVER
Filed May 22, 1962   3 Sheets-Sheet 2
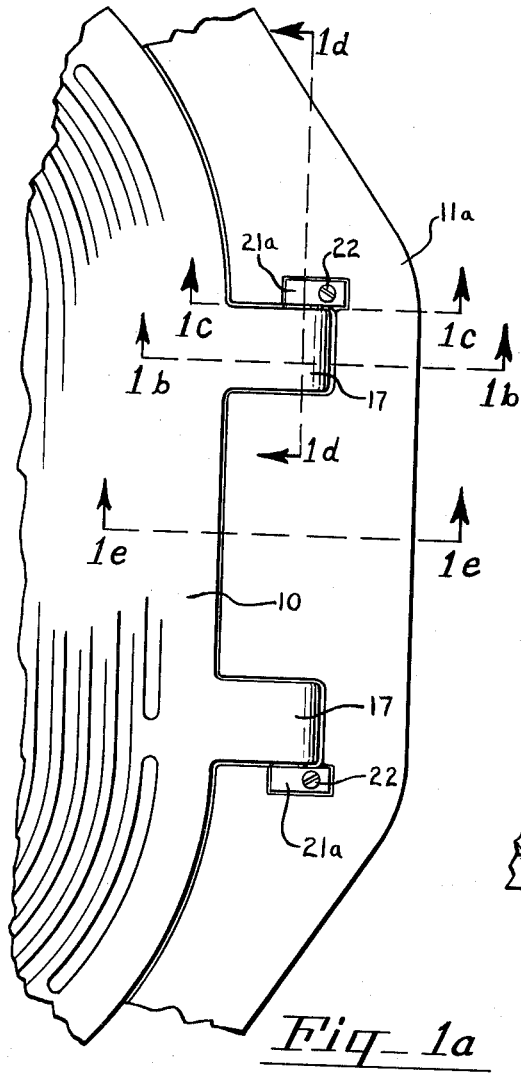
Fig_1a
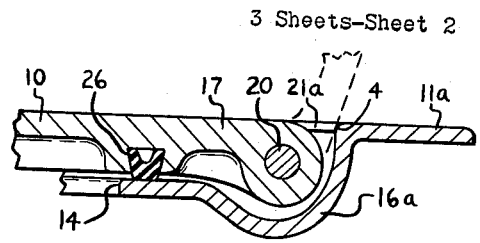
Fig_1b
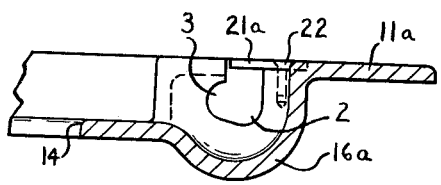
Fig_1c
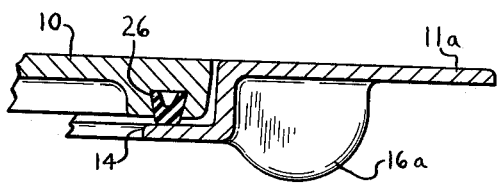
Fig_1e
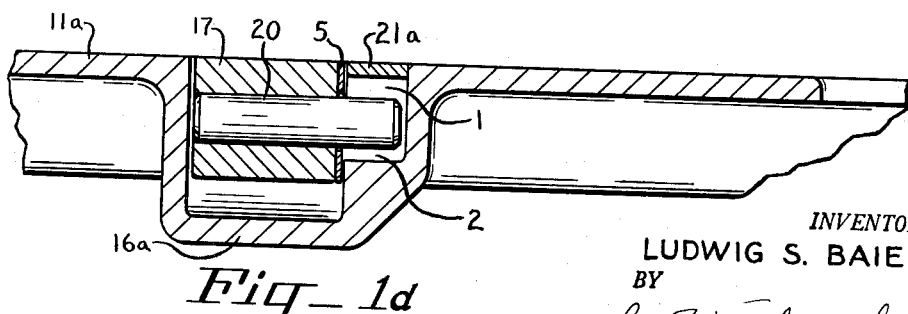
Fig_1d
INVENTOR.
LUDWIG S. BAIER
BY
Attorney Oct. 5, 1965
L. S. BAIER
3,209,663
HATCH COVER
Filed May 22, 1962
3 Sheets-Sheet 3
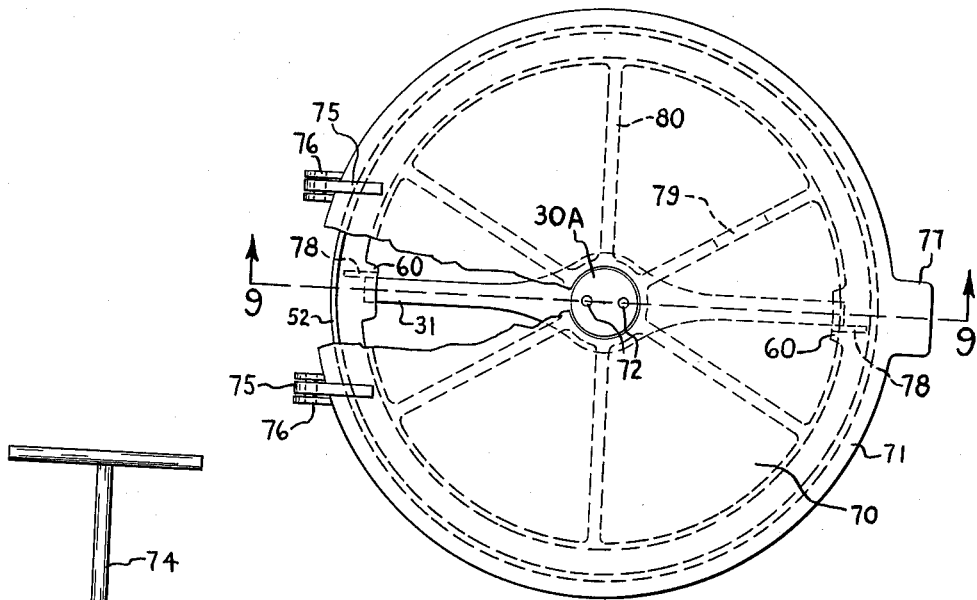
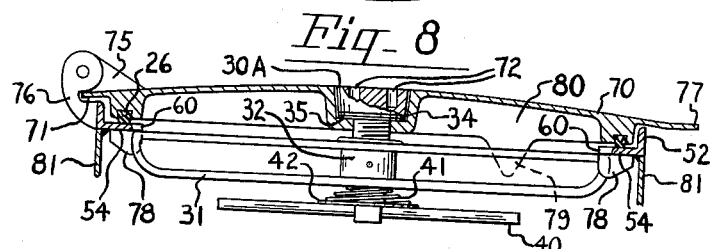
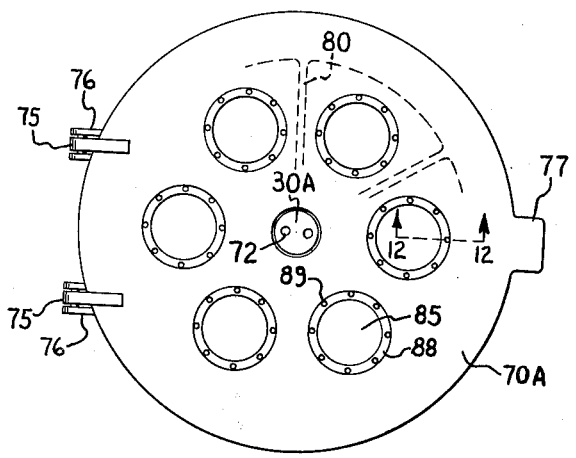
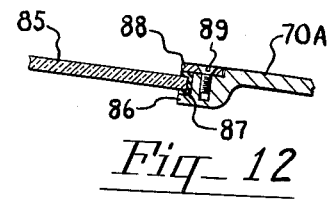
INVENTOR.
LUDWIG S. BAIER
BY
*Lee R. Schermerhorn*
Attorney ved Oct. 5, 1965

United States Patent Office 3,209,663
Patented Oct. 5, 1965

3,209,663
HATCH COVER
Ludwig S. Baier, Portland, Oreg.
(P.O. Box 158, Tolovana Park, Oreg.)
Filed May 22, 1962, Ser. No. 196,647
3 Claims. (Cl. 94—35)

This invention relates to a cover for closing a hatch, manhole, or other such opening.

Objects of the invention are to provide a cover having a watertight seal which may be locked securely in place, to provide novel and improved locking means, to provide locking and clamping means which is operable from both inside and outside, to provide a locking bar which is movable by a bolt both rotatively and axially to lock and clamp the cover, to provide an improved hinge construction, to provide an airtight entry cover for fall-out shelters and the like, and to provide a generally improved and simplified form of construction for the purposes described which is rugged and serviceable in operation and which is relatively economical to manufacture.

The main features of the present construction may be applied either to covers with hinges or covers without hinges. In either case the cover is securely locked in place by a locking bar which is rotatable into locking position against the underside of a deck ring which receives the cover. The bar is clamped by a bolt passing through the cover and bar. Means are provided on opposite ends of the bolt for rotating it from either the outside or inside of the cover. A peripheral seal on the cover maintains a watertight and airtight joint when the cover is locked and clamped in place.

The foregoing and other objects and advantages will become apparent and the invention will be better understood from the following description of the preferred embodiments of the invention illustrated on the accompanying drawings. Various changes may be made, however, in the details of construction and arrangement of parts, and all such modifications within the scope of the appended claims are included in the invention.

In the drawings:

FIGURE 1 is a top plan view, with parts broken away, of a hinged hatch cover embodying the principles of the invention;

FIG. 1a is a fragmentary top plan view showing a modified form of hinge construction for the hatch cover in FIGURE 1;

FIGURE 1b is an enlarged sectional view taken on the line 1b—1b of FIGURE 1a;

FIGURE 1c is a sectional view taken on the line 1c—1c of FIGURE 1a;

FIGURE 1d is a sectional view taken on the line 1d—1d of FIGURE 1a;

FIGURE 1e is a sectional view taken on the line 1e—1e of FIGURE 1a;

FIGURE 2 is a sectional view taken on the line 2—2 of FIGURE 1;

FIGURE 3 is a fragmentary enlarged sectional view taken on the line 3—3 of FIGURE 1;

FIGURE 4 is a fragmentary enlarged sectional view taken on the line 4—4 of FIGURE 1;

FIGURE 5 is a top plan view with parts broken away, showing a hatch or manhole cover without hinges embodying the features of the invention;

FIGURE 6 is a sectional view taken approximately on the line 6—6 of FIGURE 5;

FIGURE 7 is an enlarged sectional view taken on the line 7—7 of FIGURE 6;

FIGURE 8 is a top plan view of another modification;

FIGURE 9 is a sectional view taken on the line 9—9 of FIGURE 8;

FIGURE 10 is an elevation view of a special wrench for locking and unlocking the cover in FIGURE 8;

FIGURE 11 is a top plan view of a cover similar to the cover in FIGURE 8 but equipped with lights; and FIGURE 12 is an enlarged sectional view taken on the line 12—12 of FIGURE 11.

In FIGURE 1, the oblong cover 10 is hinged to a flanged deck ring 11 and provided with a hand hold 12 for opening and closing the cover. Deck ring 11 has a vertical portion 13 of slightly greater height than the thickness of the marginal portion of the cover. The lower end of this vertical portion is connected with an inwardly projecting lower flange 14 for seating the cover, and the upper end is connected with an outwardly projecting upper flange 15 for mounting the deck ring on a deck or other support.

One side of the deck ring is equipped with hinge pockets 16 to receive the hinge lugs 17 on the cover. The side walls of hinge pockets 16 are extended or thickened and shaped to provide generally semi-cylindrical bearing recesses 18 for the end portions of the hinge pins 20. The outer ends of recesses 18 are closed so that there is no joint between the hinge pocket and hinge pin to allow leakage through the deck ring. Thus, the end portions of each hinge pin 20 rest in the recesses 18 with the end surfaces of the pin confronting side wall surfaces of the pockets 16 while the center portion of the hinge pin is contained in the hinge lug 17. The hinge pin may also take the form of trunnions cast integrally with the cover and projecting from opposite sides of the hinge lugs 17, if desired. Any water entering the hinge pocket 16 cannot escape through the deck ring. The hinge pins or trunnions are held in place by overlying cap plates 21 which are secured to the deck ring in recessed positions by screws 22. The bottom wall of hinge pocket 16 is integral with the bottom flange 14, as shown in FIGURE 3.

The under surface of the cover is provided with a groove 25 adjacent its peripheral edge to receive a V-shaped resilient rubber seal ring or gasket 26. The upper end of this groove is wider than its lower end so that the opposite side walls of the groove converge downwardly. The seal ring may be readily inserted by squeezing the legs of the V together. When released the legs spring apart to retain the seal ring in the groove. The seal ring has a vertical height somewhat exceeding the vertical depth of the groove whereby the lower edge of the seal ring protrudes beneath the underside of the cover 10. Thus, the seal ring supports the cover on flange 14 with a slight space between the cover and flange and with the open space between the legs of the seal ring allowing for distortion or flow of the rubber when the ring is compressed downwardly.

The parts just described are clamped together by means of a bolt 30 and a yoke 31 which may also be referred to as a strong back or loading bar, the latter having an internally threaded central boss 32 to receive the threaded shank of the bolt. The head of the bolt is received in a recess 33 in the center of the cover and arranged to seat on a washer 34 and gasket 35 to seal the bolt hole 37 through the cover against the entrance of moisture. The head of the bolt is equipped with a polygonal wrench socket 36 for turning the bolt from the upper side of the cover and the bolt hole 37 at the bottom of recess 33 is unthreaded so that the bolt will turn freely relative to the cover.

The lower end of the bolt is equipped with a handle in the form of a cross bar 40 for turning the bolt from the underside of the cover. A coil spring 41 and washer 42 are interposed between handle bar 40 and the underside of locking bar 31 to provide sufficient frictional engagement between the bolt and bar 31 for turning the latter to lock and unlock the cover. The locking bar 31 is long enough to engage under the flange 14 when turned crosswise of the cover as shown, but when the bar 31 is turned away from this position, its ends lose engagement with flange 14 to unlock the cover. The range of rotative movement of the yoke is limited by a pair of stop lugs 45 and 46 on the underside of the cover.

To close the cover the locking bar 31 is rotated into engagement with lug 46 as shown in broken lines in FIG-URE 1 so that the bar will pass through the hatch opening allowing the V-shaped gasket 26 to seal on flange 14. As a result of previous opening, bar 31 is normally already in engagement with lug 46 and at a slightly lower position on the threads of bolt 30 than it appears in FIGURE 2 whereby when the bolt is turned in a direction to tighten it (clockwise in FIGURE 1) the bar 31 will rotate with the bolt and clear the underside of flange 14, the rotation of bar 31 being stopped by lug 45 in the locking position shown in solid lines in FIGURE 1.

Further rotation of the bolt then draws bar 31 up against the underside of flange 14 and still further rotation draws the cover downward to compress the gasket 26. In such further rotation of the bolt, spring 41 operates as a slipping clutch to permit the bolt to turn in the bar 31, the clutch friction being reduced as the yoke rises on the bolt. The cover is thereby locked and sealed against the entrance of moisture. Hinge pins 20 can move up and down in bearing recesses 18 to permit gasket 26 to seal uniformly all around the cover.

To unlock the cover it is only necessary to turn the bolt in the opposite direction either by means of the handle bar 40 from the underside or by means of a wrench in the socket 36 in the upper side. The initial movement of the bolt in a counterclockwise direction as viewed in FIGURE 1 removes the compressive force on gasket 26, releases the bar 31 from its engagement with the underside of flange 14 and compresses spring 41. As soon as the bar 31 is free of frictional engagement with flange 14, its increasing engagement with spring 41 and its frictional engagement with the bolt threads operate as a clutch to cause the bar 31 to turn with the bolt until the bar 31 engages lug 46. The cover is thereby unlocked and ready for opening. Spring 41 is of tapered spiral configuration so as to compress flat against washer 42.

Briefly stated, bar 31 is movable axially on the bolt between clamped and unclamped positions in a vertical range and is movable with the bolt between locked and unlocked positions in a horizontal or rotative range. In order to open the cover, bar 31 is first moved vertically to unclamped position and then rotated horizontally to unlocked position.

The purpose of spring 41 is to increase the frictional rotative connection between the bolt and bar 31. If the ends of the bar 31 tend to stick to the flange 14 because of paint or rust so that the thread friction would provide insufficient torque to turn the bar 31, then further turning of the bolt will compress the spring 41 until the frictional force between bar 40 and the lower end of spring 41 and between the undersurface of bar 31 and the upper end of spring 41 becomes sufficient to break the bar loose and rotate it with the bolt. This provides assurance that the bar 31 will not fail to unlock when the bolt is turned from its upper end. The device is operative without spring 41 when no condition exists to impede turning of the bar 31 or when the cover is to be opened only from the underside.

FIGURES 1*a* to 1*d* illustrate a hinge modification. The cover 10 is the same as in FIGURE 1 but the deck ring 11*a* has a different form of hinge pocket 16*a*. Each hinge pin 20 projects only from the outer side of its hinge lug 17 for reception in a vertical slot 1 in one side wall of the hinge pocket. Slot 1 has a rounded bottom 2 which is offset laterally at 3 toward the cover to allow for lateral movement of the hing pin and to lock the hinge pin in the bottom of the slot when the cover is swung back to its broken line position in FIGURE 1*b*. In this position the hinge lugs 17 bear against the upper edge of the pocket at 4 causing the hinge pins to lock in the offset slot portion 3 and hold the cover open in a backward slant. In order to obviate machining of the castings for a close fit, washers 5 are provided to take up any looseness in the joint in a direction axially of the hinge pins.

When the cover is closed, the hinge pins are spaced below cover plate 21*a* and above the bottom portion 2 of the slot as shown in FIGURE 1*d* to allow for compression of the resilient gasket 26 when the latter is clamped against flange 14. In this way the hinges have vertical float and do not interfere with the sealing of the gasket all around the cover. At the same time, the hinge pins are entirely contained in the pockets 16*a* so that there is no opening to permit leakage of moisture through the pockets.

FIGURES 5, 6 and 7 illustrate a circular hatch or manhole cover 50 without hinges. In this case the cover is lifted and manipulated by a pair of grab handles 51. The deck ring 52 is of L-shaped cross section having a vertical cylindrical portion 53 and an inwardly directed horizontal bottom flange 54 to support the cover. The cover is supported on this flange by a compressible or distortable sealing ring gasket 26 as described in FIGURE 2.

The bolt 30 and locking bar 31 are the same as in FIGURE 2 except that the bar 31 in this case is not long enough to underlie the main portion of flange 54 which is engaged on its upper side by the sealing ring 26. The ends of the bar 31 clear the inside edge of flange 54 except at the two opposite lip portions 60. There is no need for the spring 41 because rotation of bar 31 relative to the cover is prevented in this embodiment by a pair of guides 61 which project down from the underside of the cover on opposite sides of the bar 31.

FIGURE 5 shows the cover in locked position where rotation of the bar 31 and cover in a clockwise direction is prevented by stops 62 on the underside of lips 60. When the bar 31 and cover are in this position, a match mark 65 on the cover is in register with a match mark 66 on the deck ring 52. The match mark 65 may be a groove in the top of the cover and the match mark 66 may be a small lug welded onto the outer surface of the cylindrical portion 53 of the deck ring.

The cover is closed by placing it in the deck ring with the mark 65 to the left of mark 66 and then rotating the cover clockwise in FIGURE 5 by means of grab handles 51 until the two marks are in register. This locks the ends of bar 31 under the lips 60. The cover is then sealed and secured against accidental rotation by tightening the bolt 30. This draws the cover down against the upper side of flange 54 and pulls the ends of the bar 31 up against the undersides of lips 60 to compress the yieldable gasket 26 to the extent desired.

To open the cover the bolt is turned counterclockwise in FIGURE 5 either by applying a suitable wrench in its head socket 36 from above or by turning the handle bar 40 from below. When the clamping pressure of the bar 31 has thus been relieved, the cover itself may then be rotated a few degrees counterclockwise to move the ends of the bar 31 out from under lips 60. If the cover is being opened from above, this rotation may be effected by grasping the grab handles 51, while if it is being opened from below, it may be rotated by grasping the bar 31 itself.

Certain details of construction of the foregoing embodiments may be varied to satisfy the requirements of any particular installation. For example, the L-shaped deck ring shown in FIGURES 5 and 6 is suitable for both a flush deck hatch or a raised hatch on a coaming projecting above the deck. In a similar manner the deck ring may also be mounted on or in the end of a tube, if desired. Also, when desired, the deck ring 52 may be equipped with a stop horizontal flange such as the flange 15 in FIGURES 1 and 2.

The embodiment shown in FIGURES 1 and 2 may likewise be modified by omitting the upper deck ring flange 15 except for the hinge pocket portion 16. Such a deck ring is thus adapted for mounting on a coaming or a tube as just described. Also, this first embodiment may be made without hinges. A circular cover with hinges would require elements of both embodiments. The deck ring would require the locking lips 60 of FIGURE 5 and the cover would require a relatively rotatable yoke 31 and spring 41 as shown in FIGURE 2. Thus, the present forms of construction are versatile to meet the general needs described at the beginning of the specification.

This versatility is demonstrated by the additional embodiments illustrated in FIGURES 8 to 12. For example, the cover in FIGURES 8 and 9 is designed particularly as an airtight entry cover for fallout shelters and the like. This cover combines features of both of the previous embodiments. Thus, the cover 70 is circular in shape as in FIGURE 5 but rotation is prevented as in the case of the cover in FIGURE 1.

The cover 70 has a smooth and slightly arched top surface so that any fall-out dust settling thereon will be readily blown away by the wind or washed off by rain. In order to shed dirt and water, the cover has a projecting rim 71 which overhangs the mounting ring 52. In order to eliminate large pockets which might accumulate fallout dust, the head of bolt 30a is provided with a pair of small holes 72 to receive the prongs 73 of the special wrench 74 shown in FIGURE 10.

The cover is equipped with a pair of hinge lugs 75 which are pin connected with the mating lugs or pads 76 on the mounting ring 52. The cover may be conveniently raised and lowered by a handle 77 which is merely an extension of the rim 71. The hinge pin connection is sufficiently loose in a vertical direction to permit the gasket 26 to compress all around and make an airtight seal against the ring flange 54.

The locking bar 31 operates in the same manner as the locking bar in FIGURES 1 and 2. Stops 78 on the ring 52 limit rotation of the locking bar in a clockwise direction while a stop 79 on one of the radial reenforcing ribs 80 of the cover limits rotation of the bar in a counter-clockwise direction.

For use on a fall-out shelter the ring 52 may be welded to a cylindrical steel tube 81 which forms the entrance to the shelter. When the entrance tube is upright the rim flange 71 on the cover sheds dirt and water so that such materials will not collect on the flange 54 and fall into the shelter when the cover is opened.

With slight modification the fall-out shelter entrance cover of FIGURES 8 and 9 may be adapted for use as a hatch cover for pleasure boats. Such a modification is shown in FIGURES 11 and 12 where the cover 70a is provided with openings between the ribs 80 for glass lights 85. The cover casting is provided with an inwardly projecting flange 86 in each opening to form a seat for the glass. The joint between the glass and metal is sealed with a suitable mastic or gasket at 87 and the glass is clamped in position by a retaining ring 88 flush with the top surface of the cover. This ring is secured by a plurality of screws 89.

In all other respects the hatch cover in FIGURES 11 and 12 is the same as the cover shown in FIGURES 8 and 9, the ring 58 being welded to a circular coaming corresponding to the entrance tube 81 in FIGURE 9. This hatch cover admits daylight into the compartment or stateroom below deck while closed and sealed to exclude water.

Having now described my invention and in what manner the same may be used, what I claim as new and desire to protect by Letters Patent is:

1. A flush deck hatch or manhole construction having a cover with locking and clamping means which is operable from both inside and outside, said construction comprising a supporting ring having a continuous inwardly directed horizontal flange and a vertical wall extending upward from the outer edge of said flange, a cover plate having a peripheral gasket groove in its under side, a resilient gasket ring mounted in said groove and projecting below said under side of the cover plate to support the cover plate on said flange, a central bolt projecting through a smooth bore hole in said cover, a head on said bolt recessed in the upper side of said cover, wrench engaging means in said head for turning the bolt from the upper side of the cover, a washer and a gasket on said bolt under said head, a locking bar having threaded engagement with said bolt on the under side of said cover, a transverse handle bar on the lower end of said bolt for turning the bolt from the under side of the cover, a coil spring on said bolt between said locking bar and said handle bar to increase the frictional rotative drag between said locking bar and bolt, said locking bar being rotatable with said bolt between locked and unlocked positions, stops on said cover on opposite sides of said locking bar limiting rotation of said locking bar relative to said cover, said locking bar in locked position having its opposite ends underlying portions of said flange and in unlocked position having said ends clearing said flange so that the locking bar will pass through the supporting ring with the cover when the cover is lifted, said bolt being rotatable in said locking bar to clamp said cover and compress said gasket.

2. A construction as defined in claim 1 including a watertight hinge pocket in said supporting ring outward of said horizontal flange and gasket ring, a hinge lug on said cover plate, a hinge trunnion pin in said lug, a vertical hinge pin slot in a side wall of said pocket having a vertically open upper end to receive said pin whereby said cover plate may be installed by dropping said pin vertically into said slot, and a removable retaining plate overlying said upper end of said slot to retain said hinge lug in said pocket.

3. A flush deck hatch or manhole construction comprising a supporting ring having a flat, peripherally continuous, inwardly directed horizontal flange, a cover plate having a peripheral resilient gasket ring on its under side to support the cover plate on said flange, locking and clamping means on said cover plate operable from both inside and outside to compress said gasket against said flange, a watertight hinge pocket in said supporting ring outward of said horizontal flange and gasket ring, a hinge lug on said cover plate, a hinge trunnion pin in said lug, a vertical hinge pin slot in a side wall of said pocket having a vertically open upper end to receive said pin whereby said cover plate may be installed by dropping said pin vertically into said slot, a removable retaining plate overlying said upper end of said slot to retain said hinge lug in said pocket, and a lateral offset portion at the lower end of said slot extending in a direction toward said flange and gasket ring to hold said trunnion pin when the cover plate is opened to a backward slanting position.

References Cited by the Examiner

UNITED STATES PATENTS

| 148,102 | 3/74 | Williamson et al. | 292—260 X |
|---|---|---|---|
| 458,525 | 8/91 | Farlow | 94—35 |
| 1,191,432 | 7/16 | Jones | 94—35 |
| 1,298,678 | 4/19 | Dreier | 94—36 |
| 1,582,209 | 4/26 | Ehret | 292—260 X |
| 2,334,012 | 11/43 | Koch et al. | 292—212 X |
| 2,493,034 | 1/50 | Sabins | 292—260 |
| 2,790,198 | 4/57 | Schoen et al. | 16—128 |
| 2,805,016 | 9/57 | Brooking et al. | 16—128 |
| 3,130,651 | 4/64 | Werner | 94—36 |

FOREIGN PATENTS

| 1,876 | 4/90 | Great Britain. |
|---|---|---|
| 529,826 | 11/40 | Great Britain. |

CHARLES E. O'CONNELL, *Primary Examiner.*

JACOB L. NACKENOFF, HENRY C. SUTHERLAND,
*Examiners.*